Jan. 23, 1968  G. COMES  3,364,737
INSTRUMENT FOR TESTING THE MECHANICAL
BEHAVIOUR OF MATERIALS AT VARIOUS
DEPTHS IN A BOREHOLE
Filed April 19, 1965

INVENTOR
GILBERT COMES
By Irwin S. Thompson
ATTY.

United States Patent Office 3,364,737
Patented Jan. 23, 1968

3,364,737
INSTRUMENT FOR TESTING THE MECHANICAL BEHAVIOUR OF MATERIALS AT VARIOUS DEPTHS IN A BOREHOLE
Gilbert Comes, Epinay-sur-Seine, France, assignor to Electricite de France (Service National), Paris, France, a French national service
Filed Apr. 19, 1965, Ser. No. 449,069
Claims priority, application France, Apr. 30, 1964, 972,981
12 Claims. (Cl. 73—151)

ABSTRACT OF THE DISCLOSURE

An instrument for testing the mechanical behaviour of borehole walls has flexible walls within which is formed a pressure chamber. The admission of pressure fluid into the chamber causes outward expansion of the flexible walls against the borehole, and extensometers forming part of the apparatus measure this expansion. The extensometers are angularly spaced and have nonaligned axes of movement.

---

Figure 1A:
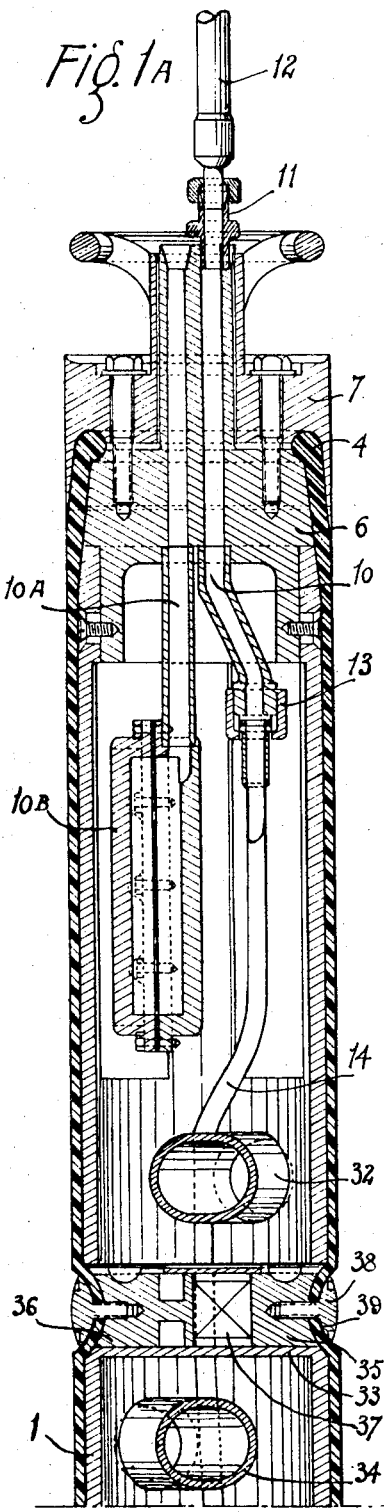
Figure 1B:
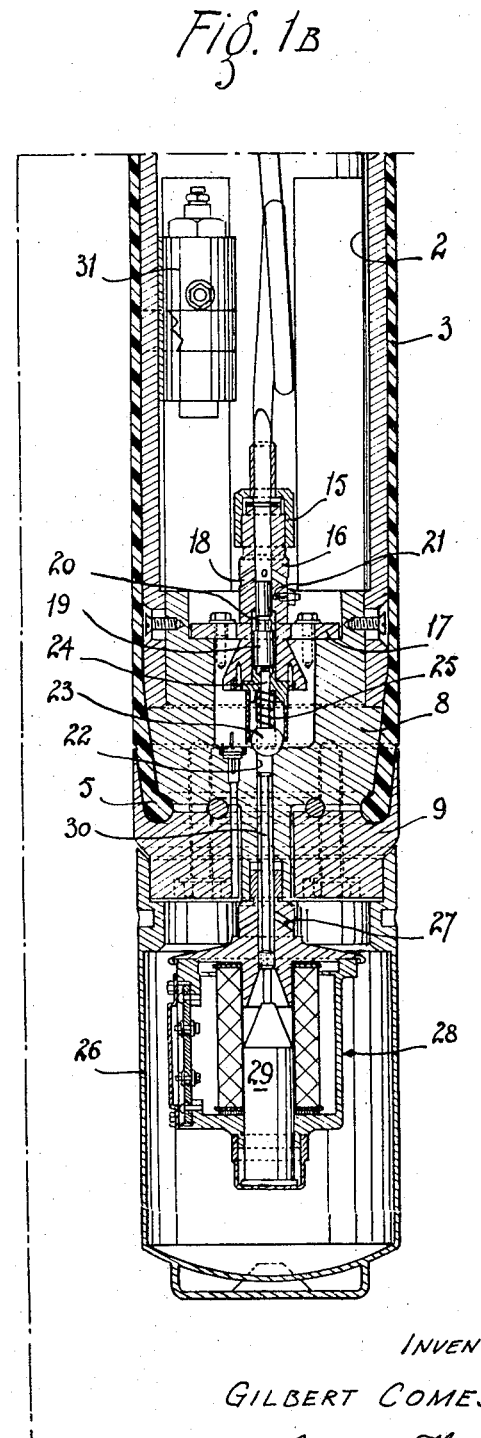

The present invention relates to an instrument for testing the mechanical behaviour of materials at various depths in a borehole.

Known instruments for this purpose comprise an extensible body adapted to be lowered into a borehole formed for this purpose in materials which may be either natural (e.g. rocks, soil), or artificial (for example concrete, etc.), in conjunction with hydraulic means for applying a radial force to the borehole wall through the agency of the said body and measuring and recording means for the resultant deformation in dependence on the applied pressure.

The instruments at present known, however, can supply only fragmentary information as regards the behaviour of the material tested and reveal only some of the characteristics of such behaviour; deformations are as a rule shown only in a single direction and there is insufficient control of the distribution conditions of the pressures applied to the borehole wall.

An object of this invention is to obviate such inadequacies by means of an instrument which is adapted to provide uniform application of a pressure of accurately controllable value over the entire wall of a portion of a borehole and to measure the diametric deformations of the wall material in several directions simultaneously, preferably in three 120° spaced directions, in dependence on the pressure developed.

According to the invention there is provided an instrument for testing the mechanical behaviour of materials at various depths in a borehole, comprising a frame and supported thereon a flexible diaphragm to define a hollow, generally cylindrical structure; first and second means closing the ends of said structure to form a chamber therein; an inlet provided in said first closure means for allowing fluid to be pumped under pressure into said chamber to cause outward extension of said diaphragm; and a plurality of extensometers supported in said frame to measure the outward extension of said diaphragm.

In a preferred embodiment of the invention the second closure means is provided with an outlet for allowing fluid to escape from said chamber, there further being valve means for controlling the escape of this fluid, such valve means preferably being adapted to shut-off the inlet when the outlet is opened. This feature conveniently and economically allows the diaphragm to be detached from the borehole without any need for a flexible centripetal return force whose presence would quite likely render the results of the measurements incorrect.

For a better understanding of the present invention and to show how the same may be carried into effect reference will now be made to the single figure of the accompanying drawing, this figure showing a section along the longitudinal axis of an instrument according to the invention. The figure is drawn in two parts, part A being the upper portion of the instrument (as lowered into a borehole) and part B being the lower portion.

In the embodiment selected for illustration, the instrument body comprises a rigid frame 1 formed by a steel tube having a number of apertures 2 to reduce weight, and covered by a flexible diaphragm 3. The latter, which may be of natural or synthetic rubber or an appropriate plastic, has annular beads 4 and 5 at its ends, these beads being respectively secured in a top closure member formed by a plug 6 and a cap 7 and a bottom closure member formed by a plug 8 and a cap 9. Thus the diaphragm and the closure member define a generally cylindrical chamber into which fluid can be pumped under pressure as will be described.

Through the plug 6 of the top closure member there extend an oil inlet duct 10 and a duct 10A for the passage of an electric cable having the required number of conductors for electrical parts mentioned below for connection to a terminal box 10B. All the electrical connections have been omitted from the drawing.

A connection 11 adapted to receive the end of a flexible hydraulic feed pipe 12 is disposed at the entry to the oil inlet duct 10. The inlet duct terminates at a connector 13 from which a tube 14 extends through the instrument body via a connection 15 to a diffuser 16 secured to the plug 8 by a flange 17. The diffuser has a tubular duct from which a number of downwardly inclined radial ducts 18 extend and in which a piston 19 formed with a groove 20 is freely slidable. A spring-loaded locking ball 21 is adapted to engage in the groove 20 when the piston is moved upwardly in the tubular duct to a position in which it closes the entry to the ducts 18.

The bottom plug 8 which provides an outlet from the pressure chamber is formed with an axial duct 22 the inlet to duct 22 forming the seat for a valve member 23 connected to a rod 24 and normally held closed by a spring 25. The end of the rod 24 passes into an axial bore of the duct containing the piston 19.

From the cap 9 a cylindrical wall structure extends away from the pressure chamber, this structure being closed at the bottom end to provide a venting reservoir. The reservoir communicates with the duct 22 through a plurality of discharge ducts 27. An electromagnet 28 mounted beneath the closure member 8–9 has a movable magnetic plunger 29 bearing a push-rod 30 which extends towards the valve member 23.

A pressure pick-up 31 mounted inside the frame 1 and within the pressure chamber is adapted to deliver an electric signal representing the actual value of the pressure inside the instrument.

In the central part of the body, the tubular frame 1 has three tubular passages 32, 33, 34 radially and equi-angularly offset by 120° about the longitudinal axis of the body. Each passage is adapted to receive and support an extensometer, one of which can be seen in passage 33. Each extensometer comprises two pistons 35 and 36 mounted within the frame interiorly of the diaphragm 3 and the movable section of a movement pick-up 37. The outer surface of each piston is rigidly connected to a portion of the adjacent diaphragm by means of a suitably profiled head of a screw (such as 38) which screws into the piston and which acts as a measuring stud, the head being exterior to the diaphragm and having a protective cup 39 interposed between it and the diaphragm. The cup 39 which may be made of copper enables the diaphragm to be clamped between the screw and the piston without causing the diaphragm to shift.

The instrument is lowered into a borehole, the supply pipe 12 is connected to a test pump by means of which the pressure in the instrument is built up so that the diaphragm 3 is pressed outwardly against the wall of the borehole, the hydraulic pressure being continuously checked by means of the pressure pick-up 31. By means of the pump, the pressure is varied to a predetermined program and the three extensometers deliver signals which independently represent the diametric deformation of the material of the borehole wall under the effect of the pressure applied thereto by means of the diaphragm 3. These signals are automatically recorded by conventional means (not shown) in dependence on the pressure variations.

After a test run of this kind at a given depth, the pump is stopped, but a residual pressure remains in the body of the instrument because of the pressure head, and under the effect of this residual pressure the diaphragm continues to adhere to the wall of the borehole.

To detach the diaphragm from the wall, an energisation circuit (not shown) of the electromagnet 28 is closed, and as the plunger 29 is lifted by the magnetic field it opens the valve 23 via the push-rod 30 so that some of the fluid in the pressure chamber can escape into the venting reservoir. Partial venting of the instrument is checked by means of the pick-up 31 and is continued until the residual pressure no longer remains within the instrument body. Lifting of the valve 23 also results in closure of ducts 18 by the piston 19, acted upon by the rod 24, and the locking of the piston 19 in its closed position. As a result of this valve arrangement, the instrument pressure chamber is isolated from the supply pipe 12, and the latter can thus remain under pressure.

As soon as the residual pressure has been released by partial venting of the instrument body, the instrument is no longer attached to the borehole wall and can be moved to a different level where a new measuring cycle can recommence, the first pressure surge of the cycle moving the piston 19 downwardly since the holding force of the locking arrangement 20 and 21 is suitably limited for this purpose.

In one example of an embodiment, the instrument body has a length of 1.60 metres and a diameter of 0.160 and its equipment is adapted to develop a uniformly distributed pressure of 150 kg. per sq. cm. A fluid-tight 12-way outlet provides for the connections of a multi-core cable and enables the instrument to be connected to a surface measuring unit. This unit enables the deformation measured over the three diameters to be simultaneously followed on a graph and shows the actual hydraulic pressure in the instrument as transmitted to the material. The elongate structure of the body of the instrument makes it possible for the extensometers to be mounted away from the ends of the body.

The instrument above described may be modified in various ways. For example, the venting valve and the closure piston could be combined in a single multi-way slide or cock valve, the venting reservoir can be dispensed with if there is no objection to a loss of the discharged hydraulic liquid, more particularly if such liquid is water; in some cases, the three extensometers could be replaced by two extensometers operating in two orthogonal directions, or the number of directions explored could be increased.

What I claim is:

1. An instrument for testing the mechanical behaviour of materials at various depths in a borehole, comprising a frame and supported thereon a flexible diaphragm to define a hollow, generally cylindrical, structure; first and second means closing the ends of said structure to form a chamber therein; an inlet provided in said first closure means for allowing fluid to be pumped under pressure into said chamber to cause outward extension of said diaphragm; and a plurality of extensometers angularly spaced from each other and supported in said frame and having nonaligned axes of movement to measure the outward extension of different portions of said diaphragm.

2. An instrument as claimed in claim 1, in which said frame includes three tubular structures for receiving said extensometers and having their axes radially disposed with respect to the axis of said cylindrical chamber, and equi-angularly offset from one another about the axis of said chamber.

3. An instrument according to claim 1, in which said closure means comprises a plug T-shaped in longitudinal cross section, the head of the T-shape being directed outwardly of said chamber, and a cap surmounting the head of said plug.

4. An instrument according to claim 1, and an outlet provided in said second closure means for allowing fluid to escape from said chamber, and valve means associated with said inlet and outlet and operable to shut-off said inlet when said outlet is opened.

5. An instrument according to claim 4, said valve means having an electromagnetic device associated therewith and operable by an electrical signal applied to said device.

6. An instrument as claimed in claim 4, said valve means including a spring-loaded locking arrangement for maintaining said inlet shut-off when said outlet is closed again after being opened, said spring having such holding force as to allow release of said locking arrangement upon the application to said valve means of further pressure at the inlet due to further pumping of fluid.

7. An instrument as claimed in claim 4, said valve means being mounted on said second closure means and comprising a tube extending from said second closure means into said chamber, a supply pipe connecting said tube to said inlet; a plurality of ducts disposed in the walls of said tube to allow fluid to flow into said chamber; a piston slidable in said tube to close off said plurality of ducts when said valve means is operated; a spring-loaded valve mechanism to maintain said outlet normally closed; and means for transmitting the movement of said mechanism to said piston when the valve means is operated.

8. An instrument as claimed in claim 1, and a reservoir, and means interconnecting said chamber and said reservoir to allow fluid to be passed from said chamber into said reservoir.

9. An instrument as claimed in claim 8, said interconnecting means including a spring-loaded valve mechanism, the spring acting to hold the valve closed; an electric coil and a plunger of magnetic material mounted in said coil and having means for acting on said valve mechanism, under the action of a magnetic field generated by passing current through said coil, in opposition to said spring.

10. An instrument for testing the mechanical behaviour of materials at various depths in a borehole, comprising a frame; flexible walls supported by said frame to define a hollow generally cylindrical, structure members closing the ends of said frame to define a chamber; means for allowing passage of pressurized fluid into said chamber to outwardly extend said flexible walls; a plurality of extensometers; means in said frame for supporting said extensometers radially of the axis of said cylindrical structure and angularly spaced about said axis; and means operatively connecting said extensometers to said flexible walls to measure deformations of the wall of said borehole under pressure transmitted thereto through said flexible walls.

11. An instrument according to claim 10, each extensometer having a piston interior of the portion of the flexible wall adjacent thereto and a stud exterior of said portion of the flexible wall and extending therethrough to fasten the piston to the flexible wall.

12. An instrument according to claim 1, said extensometers acting in substantially different directions from each other about the periphery of said cylindrical structure.

References Cited

UNITED STATES PATENTS

| 2,824,445 | 2/1958 | Reese | 73—89 |
| 2,957,341 | 10/1960 | Menard | 73—84 |
| 2,725,283 | 11/1955 | Mounce et al. | 73—152 X |
| 3,107,729 | 10/1963 | Barry et al. | 166—4 X |

RICHARD C. QUEISSER, *Primary Examiner.*

JAMES GILL, *Examiner.*

JERRY W. MYRACLE, *Assistant Examiner.*